Figure 1:
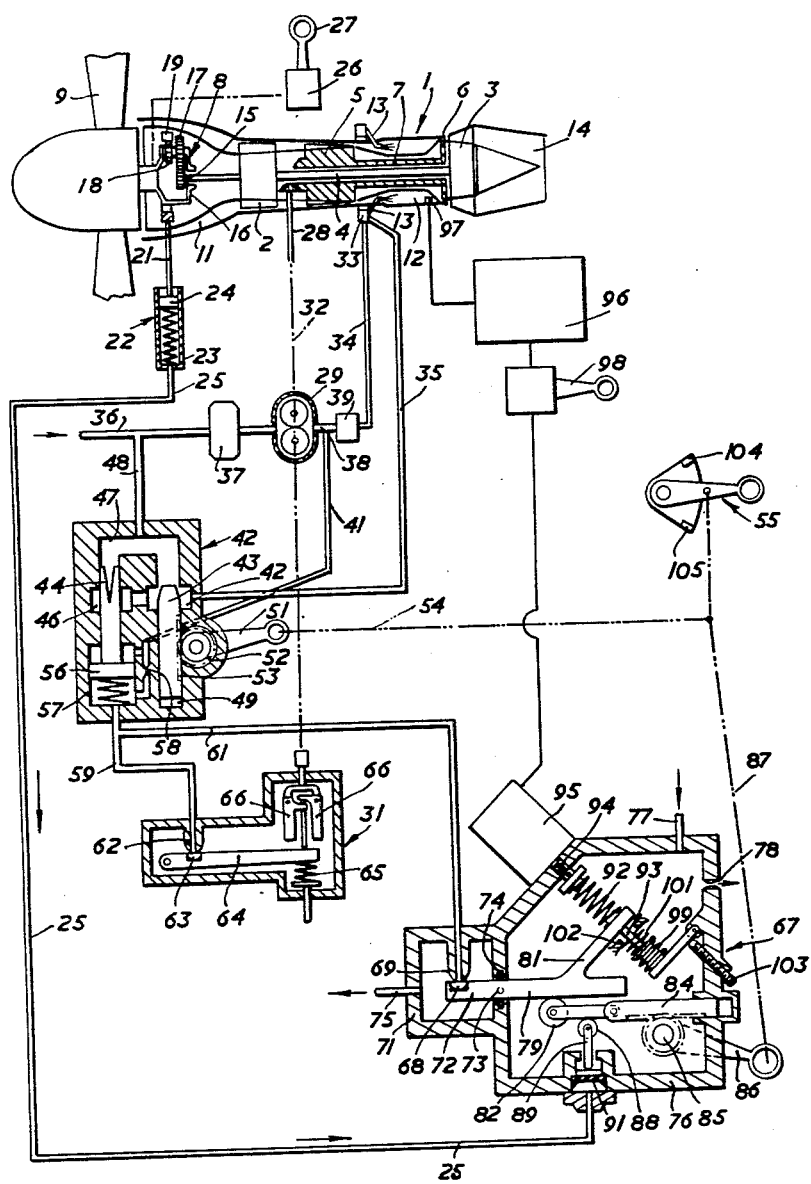

April 5, 1960    F. P. STANTON ET AL    2,931,442
FUEL SUPPLY SYSTEMS FOR PROPELLER TURBINE ENGINES
Filed June 28, 1956        5 Sheets-Sheet 1

INVENTORS
Francis P. Stanton
Stanley R. Tyler
BY
Reynolds, Beach + Christensen
ATTORNEYS April 5, 1960   F. P. STANTON ET AL   2,931,442
FUEL SUPPLY SYSTEMS FOR PROPELLER TURBINE ENGINES
Filed June 28, 1956   5 Sheets-Sheet 4

INVENTORS
Francis P. Stanton
Stanley R. Tyler
BY
Reynolds, Beeck & Christman
ATTORNEYS April 5, 1960     F. P. STANTON ET AL     2,931,442
FUEL SUPPLY SYSTEMS FOR PROPELLER TURBINE ENGINES
Filed June 28, 1956     5 Sheets-Sheet 5

United States Patent Office 2,931,442
Patented Apr. 5, 1960

2,931,442

FUEL SUPPLY SYSTEMS FOR PROPELLER TURBINE ENGINES

Francis Patrick Stanton, Filton, Bristol, and Stanley Ralph Tyler, Cheltenham, England, assignors to The Bristol Aeroplane Company Limited, Bristol, England, and Dowty Fuel Systems Limited, Cheltenham, England Application June 28, 1956, Serial No. 594,433

Claims priority, application Great Britain July 1, 1955

6 Claims. (Cl. 170—135.72)

This invention relates to fuel supply systems for gas turbine engines which supply useful rotary power to a mechanical load. More specifically this invention is concerned with aircraft propeller turbine engines. The main object of the present invention is to provide a simple fuel flow control system for a gas turbine engine which facilitates control to maintain a desired power output, whilst a further object of the invention as far as aircraft propeller turbine engines are concerned is to enable a reduction in weight of the engine and propeller to be achieved.

Broadly, in accordance with the present invention the fuel supply system for a gas turbine engine which supplies useful rotary power to a mechanical load comprises a fuel pump, means responsive to torque applied by the engine to the load for controlling the amount of fuel supplied from the pump to the engine so as to maintain the torque constant at a selected value and a regulator acting upon the means responsive to torque to permit selection of the value of the torque which is to be maintained. In the case of an aircraft propeller turbine engine it is preferred that the range of adjustment of engine torque should have a definite upper limit which agrees with the permissible maximum torque that may be transmitted by the reduction gear to the propeller. By this means the propeller and reduction gear may be kept to a comparatively low weight since it will not be possible for the engine to exert at low altitudes the whole torque of which it is then capable, whilst when flying at altitude the whole engine power then available may be used. The propeller and reduction gear are so chosen that the maximum permissible torque exerted on them is sufficient to permit the whole aircraft to take off under the most adverse conditions. It is preferred in this case that the propeller should be of the variable pitch type and should be automatically controlled by any known type of constant speed control which operates to keep the propeller speed at a constant value by appropriate variations of the propeller pitch. By setting the speed and the torque at constant values the power output will also be set at a constant value.

Figure 2:
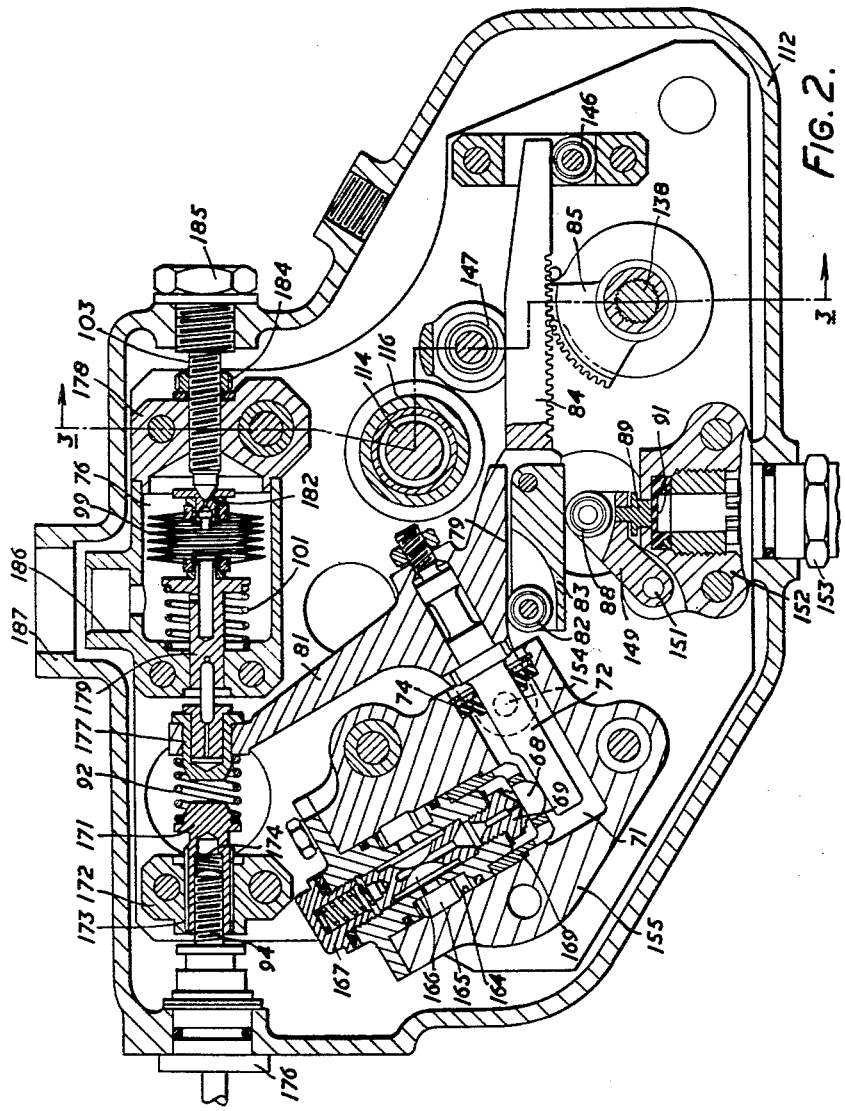
Figure 3:
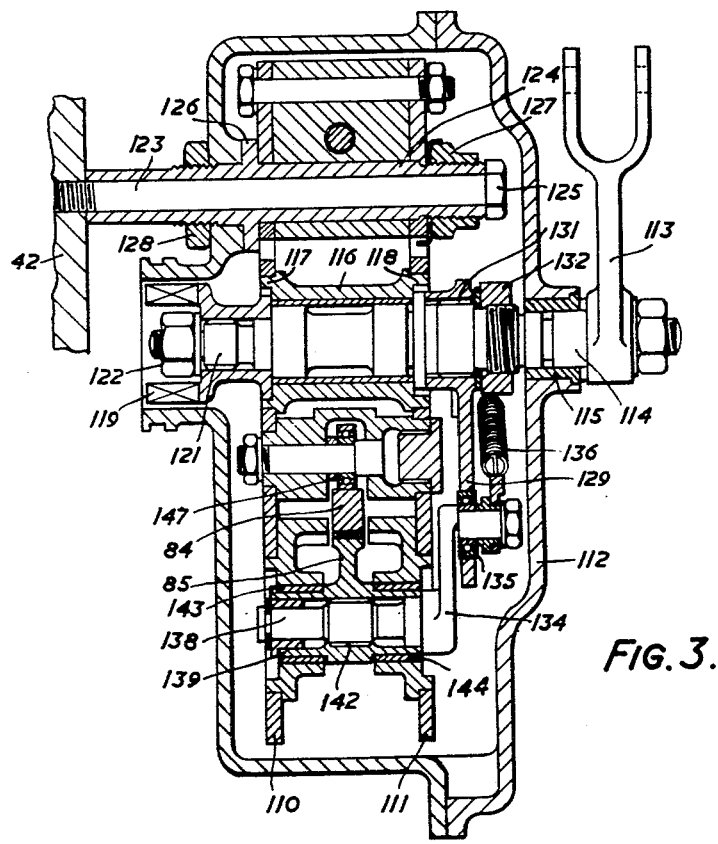
Figure 5:
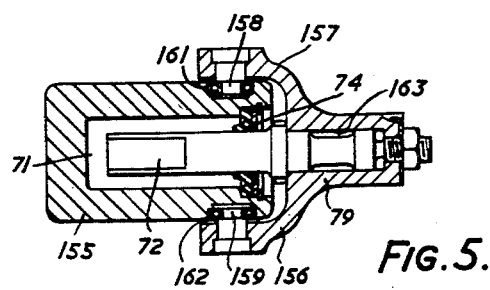
Figure 4:
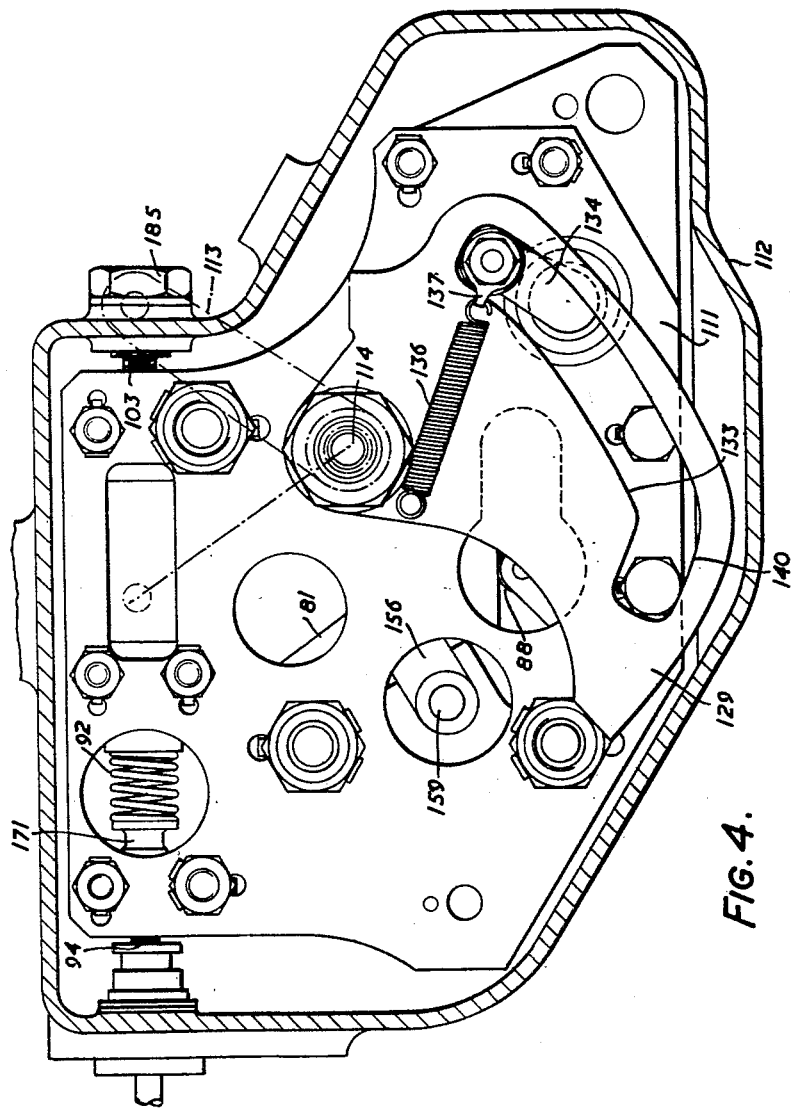

In order that the invention may be clearly understood, two embodiments thereof will be described with respect to the accompanying drawings in which:

Figure 1 is a diagrammatic representation of the fuel system applied to an aircraft propeller turbine engine and using mechanical means to vary the torque control, Figure 2 is a cross-section of the torque selector mechanism used in Figure 1, Figure 3 is a cross-section of the torque selector mechanism on the line 3—3 of Figure 2, Figure 4 is an elevation of the torque selector mechanism of Figures 2 and 3, Figure 5 is a detail view of a part of the torque selector mechanism of Figures 2, 3 and 4, and Figure 6 is a diagrammatic view of a hydraulic version of the torque selector mechanism.

Referring initially to Figure 1, an aircraft gas turbine propeller engine is indicated at 1 and comprises a low pressure compressor 2 directly coupled to a low pressure turbine 3 by a shaft 4, a high pressure compressor 5 directly coupled to a high pressure turbine 6 by a sleeve 7 which surrounds shaft 4, an epicyclic reduction gear 8 driven by the low pressure turbine and a variable pitch propeller 9 driven by the gear 8. Air entry passages 11 allow air to enter the low pressure compressor 2 whence it passes to the high pressure compressor 5 and the combustion chambers 12. Burners 13 of the spill variety inject fuel into combustion chambers 12 where it burns to heat the compressed air to drive the two turbines, the spent combustion gases leaving turbine 3 by way of a jet pipe 14.

The epicyclic gear 8 is of the compound variety and includes a sun gear 15 driven by shaft 4, a cage 16 carrying a plurality of similar planet assemblies each of which comprises a large gear 17 meshing with the sun gear and directly coupled to a smaller gear 18, and an annular gear 19 meshing with gears 18. The annular gear 19 is rotatably mounted in bearings and is prevented from rotation by a rod 21 extending from a torque sensing unit 22. This unit 22 comprises a cylinder 23, a piston 24 in the cylinder to which rod 21 is secured and a spring in the cylinder acting in compression to move piston 24 outwardly against the normal reaction exerted by the annular gear 19. Liquid is contained in cylinder 23. A pipe 25 extends from the cylinder 23 primed with liquid to carry the pressure developed in cylinder 23 to another part of the system. The propeller 9 is controlled by a constant speed unit 26 having a manual control 27 to select a desired speed of rotation of the propeller. The unit 26 will act by variation of propeller blade pitch to keep propeller speed to the selected speed, for example, under speed of the propeller will cause the pitch to decrease so that, with the same torque, the speed will increase and vice versa for an overspeed.

A bevel gear drive 28 extends from the high pressure compressor 5 and is connected to drive the gear pump 29 and the high pressure compressor overspeed governor 31 the mechanical connection being shown by a chain-dotted line 32. The burners 13 are carried by a gallery 33 surrounding the engine and fuel is carried to the gallery by a pipe 34 and spill flow returns from the gallery by pipe 35. The pump 29 draws fuel from a supply tank through pipe 36, a strainer 37 being included to prevent particles of foreign matter from entering the pump. The pump output is delivered to pipe 38 from whence it flows to pipe 34 through a pressurizing valve 39. The valve 39 may comprise a spring-loaded valve which ensures that fuel pressure in pipe 38 is higher than in pipe 34 so that adequate pressure is available for servo operation of the fuel control, fuel for this purpose being taken from pipe 38 by pipe 41.

The by-pass valve assembly 42 serves to control the amount of fuel returning in the spill pipe 35 and thus to control the amount of fuel actually leaving the burners. The assembly 42 includes two valve members 43 and 44 which control the flow of fuel from spaces 45 and 46 to the space 47. Spaces 45 and 46 are connected together to the spill pipe 35 whilst space 47 is connected through a pipe 48 to pipe 36 leading to the inlet of pump 29. The valve member 43 is slidable longitudinally in a cylinder 49 to vary the opening it allows from space 45 to space 47 and its position is controlled by means of lever 51 which rotates a pinion 52 in engagement with a rack 53 formed on valve member 43. Lever 51 is operated by a linkage indicated by chain-dotted line 54 extending to the remote manual regulator 55 which is manually adjustable to select a required torque from the engine. The valve member 44 operates automatically to trim the amount of spill fuel by-passed to pipe 36 and is controlled by a piston 56 operating in a cylinder 57. This piston is operated by fuel pressure from pipe 41 which is fed directly to the upper side thereof and through restriction 58 to the lower side thereof. Two vent pipes 59 and 61 extend from the cylinder below the piston so that it may be controlled by the flow rate of fuel through these vent pipes. Vent pipe 59 extends to governor 31 and connects to a vent opening 62 normally closed by a half ball valve 63 carried by a lever 64. This lever is loaded by a spring 65 to close the vent opening and this loading may only be overcome by excessive centrifugal force developed in flyweights 66 as a result of their being driven at a speed greater than a predetermined maximum by the high pressure compressor 5. In such a case the vent 62 would be opened allowing comparatively unrestricted flow of fuel and consequent lowering of pressure under piston 56 to cause valve member 44 to open fully and allow a high rate of fuel by-pass from spill pipe 35. Under normal conditions, however, the vent 62 may be considered as closed.

Accurate control of the fuel flow is maintained by the torque selector mechanism 67 which controls by the amount of lift of a half ball valve 68 from a vent 69 which forms the termination of pipe 61. This vent is located in a chamber 71 formed as part of the casing of mechanism 67 and the half ball valve is located in position by a lever 72 pivoted at 73 in the wall of chamber 71, a seal 74 isolating this chamber. The fuel which flows from vent 69 returns to pump inlet through pipe 75. The mechanism 67 includes a further chamber 76 shown diagrammatically as being attached to chamber 71. This chamber has an inlet pipe 77 through which air flows from the inlet passage 11 of the gas turbine. Air leaves the chamber through a restriction 78 the flow being continuous whilst the gas turbine is operating so that chamber 77 is always filled with air at the pressure and temperature of air entering the gas turbine. The chamber 76 contains a continuation of lever 72 comprising a straight portion 79 and an angled extension 81. The straight portion is contacted by a roller 82 carried at the free end of a lever 83 which in turn is pivotally mounted at the end of a slidably mounted rack 84. The rack 84 is engaged by a pinion 85 mounted for rotation with a lever 86, this latter having a mechanical connection indicated by chain-dotted line 87 with the manul regulator 55. The lever 83 is engaged, on the side remote from lever 79, by a roller 88 carried by a plunger 89 which in turn is supported by a pressure pad 91 mounted in the wall of chamber 76 and subjected to the liquid pressure in pipe 25 from the torque sensing unit 22. It will be seen that the force exerted by plunger 89 is transmitted in part only to roller 82 the proportion being determined by the position at which roller 88 engages lever 83. The moment exerted by roller 82 on lever 79 is also variable by reason of its movement on lever 79 relatively to the fulcrum 73. This movement of lever 86 varies the moment exerted on lever 79 in these two ways which are additive one to another. The moment exerted on lever 79 will therefore be proportional both to engine torque as sensed through pressure in pipe 25 and to the position of lever 86 as controlled by the setting of the torque regulator 55. The mechanical advantage given by lever 86 varies in inverse proportion to the torque selected by regulator 55.

The lever extension 81 is acted upon by a compression spring 92 and by a rod 93 in opposition to spring 92. The compression of spring 92 is adjustable by means of a rod 94 movable by a gear electric motor 95 in response to a signal received from a magnetic amplifier 96. This amplifier is basically controlled by a thermocouple 97 at the entry position of turbine 6 to prevent the temperature at this position exceeding a predetermined amount, this amount being the maximum temperature which the turbine can withstand having regard to the centrifugal stress which it must withstand. Hand lever 98 gives a small range of selection of this temperature, the higher temperatures being used only in an emergency when more power is essential or for short periods such as when taking off. The rod 93 transmits to extension 81 a force in opposition to the compression of spring 92, this force being obtained on expansion of a closed capsule or bellows 99. This capsule is filled with air at a predetermined low pressure and acts in opposition to compression spring 101 which is located against stops 102 forming part of the chamber 76. Adjustment of the combined capsule 99 and spring 101 is effected in an endwise manner by screw 103. The arrangement is such that at low altitudes the air pressure in chamber 76 maintains capsule 99 compressed to the extent that there is a gap between rod 93 and extension 81, wherefore rod 93 cannot press against lever extension 81. As altitude increases pressure in chamber 76 decreases, as does the gap between 93 and 81. At high altitudes i.e. above about 20,000 feet the reduction of air pressure inside chamber 76 enables the capsule 99 to exert force on the extension 81 and take part in the control of fuel supply. Even at lower altitudes a higher temperature affecting the air within capsule 99 will produce or tend to produce a like result.

The manual regulator 55 includes upper and lower stops 104 and 105 which provide the limits, in particular the upper limit of the power that may be selected. The limit of torque is effected particularly by the fact that the lever 86 cannot move the lever 83 and roller 82 more to the left in the drawing than is permitted by the stop 104 so that this stop represents the upper limit of the torque that may be exerted by the engine.

When the engine is running at low altitudes and the manual regulator 55 is set at a position intermediate upper and lower stops 104 and 105 the roller 82 and lever 83 will take up a position as shown in Figure 1. The constant speed unit 26 is also set for a given speed. It will be assumed that the entry temperature of turbine 6 will remain below the predetermined maximum. The movement of the lever 72—79 to cause movement of the servo by-pass valve 44 from one end of its travel to the other is very small so that it may be said that the balance of lever 72—79 is very sensitive at the point where the moment exerted by roller 82 equals the moment exerted by spring 92. At low altitude the balance of lever 72—79 always requires the same moment assuming that turbine entry temperature does not become excessively high but the action of lever 83 varies the leverage ratio from plunger 89 to lever 79 and the greater the mechanical disadvantage by movement of lever 83 to the left the greater must be the pressure exerted on pad 91 to give the required moment. The pressure on pad 91 is of course proportional to torque reaction of the gas turbine drive to the propeller by the action of the torque sensitive unit 22. In the drawing, for example, about half the maximum torque is selected and when the torque reaches this value lever 72—79 will move to open servo vent 69 thus causing by-pass valve member 44 to move to by-pass more fuel, and eventually a balance is struck where for a particular opening of servo vent 69 a particular amount of fuel is by-passed from the spill pipe to give the desired half maximum torque reaction. Any tendency of the propeller to change speed will be sensed by the constant speed unit 26 and appropriate alteration of the propeller pitch will result to keep propeller speed constant. Variation of propeller pitch may result in temporary variation of torque, in which case adjustment of the balance of lever 72—79 will take place to keep the torque constant by adjusting fuel flow. The adjustment finally arrived at gives a constant selected propeller speed at constant selected propeller driving torque. Thus it is found for given settings of control 27 and regulator 55 that at low altitudes the propeller pitch is fine and aircraft air speed is low whilst as the aircraft climbs the propeller pitch becomes coarser and the air speed consequently higher by maintaining the same torque and propeller speed.

As altitude increases the pressure in chamber 76 becomes reduced and consequently the compression on capsule 99 is reduced so that the latter expands by virtue of its own spring characteristics and the pressure of the small amount of contained air. It is arranged that in excess of 20,000 feet, but not below such a selected altitude, rod 93 presses against extension 81. By this means a moment is applied to the lever partly balancing it against spring 92 thus reducing the moment that need be supplied by roller 82 and reducing the torque required to be exerted by the engine. By arranging that the low air pressure acts on the control unit to reduce the selected torque, economy is achieved in fuel consumption for the aircraft. The amount of the reduction of selected torque which takes place depends on the actual air pressure and temperature but the variation automatically takes place and needs no action to be taken by the aircraft's pilot. At altitudes above 20,000 feet the regulator 55 thus selects at each position a proportion of the torque which would be available at that position below 20,000 feet.

With increasing altitude for a selected torque the turbine entry temperature will increase and a further reason for reducing the maximum selectable torque above 20,000 feet is to prevent this temperature from becoming excessive. The motor 95 takes action to reduce the loading of spring 92, and thus to lessen the moment required to lift lever 79 to control fuel flow at 69, in the case where this temperature becomes excessive but this will only occur if the remainder of the control mechanism should not function correctly.

To cover the range of fuel supply variations it is found that valve members 43 and 44 should be of similar size.

The constant speed unit is preferably arranged to have two selectable speeds representing a high take-off speed and a lower cruising speed. By this means higher power may be used for take-off without exceeding the maximum torque value. The maximum torque limiting stop 104 is of great importance since it is arranged so that the maximum torque developed by the engine is not capable of exceeding the mechanical strength of the reduction gear and the propeller. In fact in the design of the engine and propeller, the weight of the propeller and reduction gear is principally dependent upon the maximum torque.

When the aircraft is on the ground with the engine idling the regulator 55 will be moved back to stop 105 and generally speaking in this condition the torque exerted will not be sufficient to provide a moment on lever 72—79 which would lift it to control fuel flow. Slow idling speeds are therefore controlled by the position of valve member 43 alone, the valve member 44 being entirely closed. For this purpose the linkages 54 and 87 between regulator 55 and levers 51 and 86 is so arranged that a very small part of the movement of regulator 55 to the position against stop 105 will move only the lever 51, lever 86 remaining in the minimum torque position.

In the practical arrangement of the torque control apparatus 67 shown in Figures 2, 3, 4 and 5 the various elements are mounted between two metal plates 110 and 111 and the whole is enclosed in a casing 112. The mechanical connection from manual regulator 55 fits into a forked lever 113 which is secured to a spindle 114 extending into casing 112 through a bushing 115. The spindle 114 is mounted in a sleeve 116 having shouldered ends 117 and 118 to fit in appropriate holes in plates 110 and 111. At the opposite side of the casing to lever 113 a dog connector 119 is secured on the shaft by a splined joint 121 and nut 122 for the purpose of making mechanical connection with the by-pass valve unit 42 a fragment of which is shown in Figure 3. The apparatus 67 is secured to the unit 42 directly by means of bolts 123 of which one is shown in Figure 3. Each bolt 123 passes through the centre of a larger bolt 124 so that its head 125 is easily available. Each bolt 124 includes a flange 126 against which a nut 127 serves to clamp plates 110 and 111 together and on the opposite side of which a nut 128 clamps the casing 112 to the plates.

A cam plate 129 is secured to spindle 114 adjacent to plate 111 by means of a splined joint 131 and a nut 132. A cam slot 133 is formed in this plate in which the end of a crank 134 engages, a ball bearing 135 forming the engagement between slot and crank to keep friction to a minimum. Crank 134 is in fact lever 86. A tension spring 136 is secured between plate 129 and a tag 137 at the end of crank 134. The crank 134 is secured to a spindle 138 engaging in the hub 139 of a segmental gear 85 by means of a splined joint 142, the hub in turn being rotatably mounted in bushes 143 and 144 in the plates 110 and 112. The gear segment 141 is in mesh with a rack 84 which is slidably mounted between rolling bearings 146 and 147 which are secured between plates 110 and 111. The inner end of rack 84 is pivoted at 148 to lever 83 having at its free end roller 82. Lever 83 is engaged on its undersurface by roller 88 carried at the end of lever 149. This lever is pivotally mounted at 151 on the pad casing 152 in which pressure pad 91 is located. The pressure pad 91 co-operates with plunger 89 which presses against the underside of lever 149. The pivotal point 151 of lever 149 is located at the level of the pressure pad 91 so that the slight movement of plunger 89 does not produce side movement thereof. The housing 152 is secured between the two plates 110 and 111 and a connector 153 extends from the main casing 112 for making connection to the pipe 25.

The lever 72—79 is pivoted at position 154 in a housing 155 which includes the chamber 71. The pivotal mounting of the lever 72—79 may be appreciated particularly in Figure 5. The portion 79 of the lever is formed in the manner of a fork having arms 156 and 157 which embrace the housing 155 and include at their ends two stub spindles 158 and 159. These spindles are carried by ball races 161 and 162 located in the housing 155 such that their axis passes through the position 154. The portion 72 of the lever is in fact secured in a socket 163 in a casting which represents the part 79 and the extension 81 of the lever. The part 72 extends into the chamber 71 through a seal 74. The servo vent 69 is formed as an insert in a bore 164 in the housing 155 and servo liquid from the pipe 61 enters this bore at an annular recess 165. A further insert 166 in the bore 164 includes a plurality of fine slots through which the servo liquid must pass to reach the servo vent 69, these slots acting as a filter. The bore 164 is closed hermetically by a cap 167. The half ball 68 is located in a cage 169 surrounding the servo vent 69 and the lever 72 is arranged to press against this half ball. As previously mentioned the whole unit 67 is arranged for mounting on the by-pass valve unit 42 and in this mounting two plug connections not shown are provided which extend from the underside of housing 155 and carry fluid connections from the annular space 165 and the chamber 71 to their respective fluid passages in the unit 42.

The spring 92 is supported by a plunger 171 which is slidable in a housing 172 secured between the plates, a spline 173 serving to prevent rotation of this plunger. The plunger is interiorly screw-threaded at 174 for engagement by a screw-threaded rod 94. This rod is located in a bearing bush 176 in casing 112 so that rotation thereof will cause sliding movement of plunger 171. Spindle rod 94 is of course rotated by the motor 95. An insert 177 in the end of the extension 81 serves to locate the other end of the spring 92. A further housing 178 secured between the plates contains what is effectively the chamber 76 in which is located the capsule 99 and the spring 101. The spring 101 is located in a recess in one end of the chamber 76 and at its opposite end presses against the head of a plunger 179. The capsule 99 also engages agianst the head of plunger 179 and at its opposite end an adjusting screw 103 engages in a specially formed bearing recess 182. The screw 181 is threaded in the housing 178, a lock nut 184 being provided so that it retains its present position. Access may be obtained to the end of screw 103 for adjustment purposes through the screw cap 185 formed in the casing 112. A connection 186 is formed on the housing 178 by which the pipe 77 is connected to obtain access to the chamber 76. A suitable hole 187 is provided in the casing to allow for the connection of pipe 77.

The operation of the unit 67 will be appreciated from the description already given with the exception of one or two mechanical functions. In particular it is pointed out that manual movement supplied to the forked lever 113 simultaneously operates the by-pass valve 43 and the gear 85 by virture of the engagement of the crank 134 in the slot 133 of cam plate 129. The reason for the provision of the cam plate is to provide a substantially linear relation between the movement of valve 43 and the movement of gear 85 which of course determines the torque setting of the engine. A small portion 140 of the cam slot adjacent the low torque end is arranged to be of curved form with the axis of shaft 114 as the centre of curvature whereby at the lower end of movement of regulator 55 the valve 45 only is adjusted without movement of the torque setting crank 134. The crank 84, as seen in Figure 2, is supported in position by virtue of its engagement with the rollers 146 and 147 and the upward thrust exerted on the pivot 148 resulting from the thrust of the plunger 89. This rack is thus simply located for sliding movement.

Figure 6:
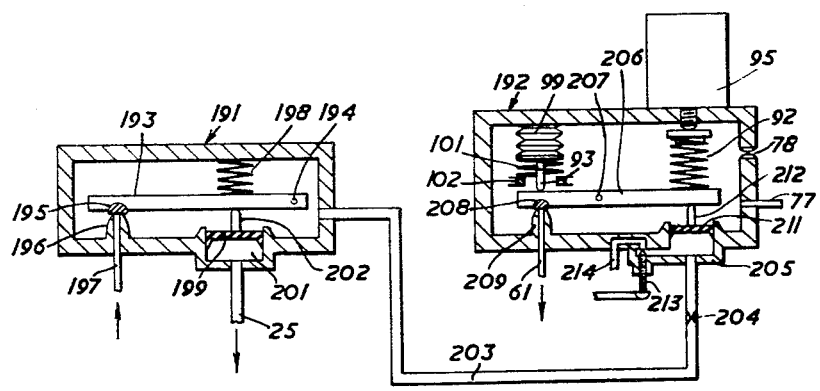

Referring to Figure 6, a hydraulic apparatus is diagrammatically shown for carrying out the function of the torque selecting mechanism 67. This apparatus comprises two chambers 191 and 192. In chamber 191 a lever 193 is pivotally mounted at 194 and at its end carries a half ball valve 195 for co-operation with a valve seat 196 to which pipe 197 is connected. Pipe 197 carries fuel under pressure as delivered by pipe 41 from the pump and a spring 198 acts on the lever to tend to close the half ball valve, the spring being such as just to maintain the half ball valve closed against fuel pressure. A pressure pad 199 is located in a suitable recess 201 in the chamber wall and this recess is connected to pipe 25 leading from the torque sensing unit 22. A plunger 202 extends from the pad to the lever tending to urge the latter in a valve-opening direction so that fuel is admitted from pipe 197. When fuel pressure in chamber 191 reaches the pressure in pipe 25 the force on rod 202 is neutralized and the half ball valve will close. Fuel leaves chamber 191 through pipe 203 and flows through restriction 204 to a recess 205 formed in the wall of chamber 192. In this chamber a lever 206 is pivotally mounted at 207 and at one end carries half ball valve 208 which co-operates with servo vent 209 connected to pipe 61 extending from the underside of servo piston 56. A pressure pad 211 is located in recess 205 and a plunger 212 extends to touch the lever 206. A passageway including a restriction controllable by screw 213 extends from recess 205 to drain through pipe 214. Pipe 77 and vent 78 maintain chamber 67 at external air temperature and pressure. Spring 92 acts in a vent-opening sense on lever 206 and its compression is adustable as in Figure 1 by motor 95. Capsule 99 and spring 101 are located by a stop 102 and co-operate with lever 206 through a rod 93 to act at high altitudes in a vent-closing sense.

In operation a particular torque is selected by rotating screw 213 to adust the controlled restriction, such rotation varying the rate of flow through pipe 203 and giving in recess 205 a fraction of the pressure existing in chamber 191. Since this latter pressure is substantially the pressure developed in the torque sensing unit 22 then it will be seen that the force developed on plunger 212 by pad 211 is a controllable fraction of the torque reaction force sensed by unit 22. The operation of capsule 99, spring 101 and plunger 93 will be substantially as described for Figure 1, also operation of spring 92 and motor 95 will be similar.

We claim as our invention:

1. For use in regulating a gas-turbine-driven propeller for an aircraft, a control system comprising: an engine fuel system including fuel flow control means, a torque selection element settable at predetermined values of torque, means operatively connecting said torque selection element to said fuel flow control means, a signal-generating means responsive to torque exerted on the propeller by the engine, means operatively connecting said signal-generating means to said fuel flow control means, whereby each position of the torque selection element within a given range coresponds to running at a different torque, and means responsive to a condition existing at the compressor inlet upon which mass flow of air through the engine is dependent, and operatively connected to said fuel flow control means by a lost motion connection so as to become effective thereon to reduce fuel flow only upon attainment of an inlet condition beyond a predetermined value in the direction of decreasing mass flow of air through the engine.

2. A control system as and for the purpose set forth in claim 1, wherein the means responsive to a compressor inlet condition includes a chamber surrounding a capsule which is expansible with reduction of external pressure, and a pressure connection extending from the compressor inlet to said chamber.

3. A control system as and for the purpose set forth in claim 1, wherein the means responsive to a compressor inlet condition includes a temperature-sensitive element located to respond to changes in inlet temperature.

4. A control system as and for the purpose set forth in claim 1, wherein the means responsive to a compressor inlet condition includes a chamber having two openings and enclosing a capsule containing air at a pressure less than sea level ambient air pressure and a duct connecting one of said openings with the compressor inlet.

5. In combination with a gas turbine engine installed upon an aircraft, a propeller, and a reduction gear driving the propeller from the engine and of a strength only sufficient to transmit the maximum torque which the engine could safely produce at a predetermined compressor inlet pressure less than sea level ambient air pressure, a fuel supply system for said engine including fuel flow control means, a torque selection element connected to said system to effect a control action thereon, means for generating a signal responsive to torque exerted on the propeller by the engine, means for applying said signal in opposition to said control action so that each position of said torque selection element corresponds to a different torque, means preventing said torque selection element being moved to positions corresponding to torques in excess of the strength of the reduction gear, and means sensitive to compressor inlet pressure connected to said system by a lost motion connection so that compressor inlet pressures above said predetermined pressure have no control effect on said system and compressor inlet pressures increasingly below said predetermined value progressively reduce fuel flow.

6. The combination of claim 5, including means sensitive to compressor inlet temperature associated with said compressor-inlet-pressure sensitive means to augment the latter with rise of compressor inlet temperature and thereby to raise the value of the compressor inlet pressure at which the lost motion in said lost motion connection is taken up.

References Cited in the file of this patent

UNITED STATES PATENTS

| | | |
|---|---|---|
| 2,667,228 | Wood et al. | Jan. 26, 1954 |
| 2,764,868 | Watson et al. | Oct. 2, 1956 |
| 2,776,720 | Reggio | Jan. 8, 1957 |
| 2,796,136 | Mock | June 18, 1957 |